United States Patent [19]

Akaki et al.

[11] Patent Number: 5,477,831
[45] Date of Patent: Dec. 26, 1995

[54] FUEL INJECTION CONTROL DEVICE FOR INTERNAL COMBUSTION ENGINE

[75] Inventors: Motonobu Akaki, Anjo; Yasutoshi Yamada, Chita; Nobuyuki Oota, Kariya; Masaki Mitsuyasu, Susono; Daisaku Sawada, Gotenba, all of Japan

[73] Assignees: Aisin Seiki Kabushiki Kaisha; Toyota Jidosha Kabushiki Kaisha, both of Aichi, Japan

[21] Appl. No.: 182,837

[22] Filed: Jan. 19, 1994

[30] Foreign Application Priority Data

Jan. 19, 1993 [JP] Japan ................................. 5-023159

[51] Int. Cl.$^6$ .................................................... F02D 41/20
[52] U.S. Cl. ............................................. 123/490; 310/316
[58] Field of Search ................................. 123/490, 498; 310/316, 317

[56] References Cited

U.S. PATENT DOCUMENTS

| 4,644,212 | 2/1987 | Moritugu et al. | 310/317 |
| 5,013,955 | 5/1991 | Hara et al. | 310/316 |
| 5,053,668 | 10/1991 | Mitsuyasu | 123/494 X |
| 5,057,734 | 10/1991 | Tsuzuki et al. | 310/317 |
| 5,208,505 | 5/1993 | Mitsuyasu | 310/316 X |
| 5,214,340 | 5/1993 | Suzuki | 310/316 |

FOREIGN PATENT DOCUMENTS

| 0464443 | 1/1992 | European Pat. Off. |
| 64-69756 | 3/1989 | Japan. |
| 1-264575 | 10/1989 | Japan. |
| 2-103970 | 4/1990 | Japan. |

OTHER PUBLICATIONS

"Patent Abstracts of Japan", Group M751, vol. 12, No. 378, Oct. 11, 1988, abstract of JP-63-130356.

*Primary Examiner*—Tony M. Argenbright
*Attorney, Agent, or Firm*—Burns, Doane, Swecker & Mathis

[57] ABSTRACT

An excess voltage applied to a piezoelectric element is detected and controlled to improve durability and reliability of the piezoelectric element. A fuel injection control device for an internal combustion engine in which a power source voltage is boosted by a dc-dc converter and the so-boosted output voltage is supplied via a first choke coil and a first thyristor to a piezoelectric element for charging the piezoelectric element, the electric charge of which is subsequently discharged via a second thyristor and a second choke coil. The fuel injection control device includes a positive voltage detection unit for detecting an excess voltage arranged between the first choke coil and the first thyristor and a positive voltage control unit controlled by an output signal of the positive voltage detection unit and adapted for shorting both ends of the first choke coil. The current through the first thyristor is cutoff to prevent the excess voltage from being applied to the piezoelectric element.

3 Claims, 3 Drawing Sheets

FUEL INJECTION CONTROL DEVICE FOR INTERNAL COMBUSTION ENGINE

BACKGROUND OF THE INVENTION

1. Field of the Invention

This invention relates to a fuel injection control device for an internal combustion engine. More particularly, it relates to a fuel injection control device in which a piezoelectric element is employed in a fuel injection valve for taking advantage of shape changes in the piezoelectric element caused by voltage application thereto.

2. Related Art

It has hitherto been known to use a piezoelectric element for a fuel injection valve for controlling the fuel injection. For example, the JP Patent KOKAI Publication No. 64-69756 (1989) discloses means for stabilizing changes in capacitance of a piezoelectric element caused by changes in temperature. The piezoelectric element is increased in capacitance with the rise in temperature. If the capacitance is increased, the piezoelectric element is deformed to a larger extent for the same applied voltage because the deformation in the piezoelectric element is proportionate to the amount of the stored electric charge which is proportionate to the capacitance value. The above cited publication proposes a fuel injection control device equipped with means for detecting the change in temperature of the piezoelectric element and accordingly controlling the voltage applied to the piezoelectric element for controlling a displacement of the piezoelectric element.

DISCUSSION OF THE RELATED ART

However, there lacks up to now a proposal for controlling an excess voltage or a negative voltage applied to a piezoelectric element employed as a fuel injection valve. The piezoelectric element suffers from the drawback that it is deteriorated or destroyed under a voltage higher than its withstand voltage, and that it is susceptible to deterioration due to a polarization when under an excessive negative voltage and thereby is lowered in reliability or durability.

It is therefore an object of the present invention to provide a protective circuit against an excess voltage or a negative voltage to improve the reliability and durability of the piezoelectric element.

SUMMARY OF THE DISCLOSURE

For accomplishing the above object, the present invention provides a fuel injection control device for an internal combustion engine in which an output voltage of a dc-dc converter for raising a power source voltage supplied thereto via an ignition switch is applied to a piezoelectric element through a first choke coil and a first thyristor controlling timing of charging the piezoelectric element, comprising:

a positive voltage detection unit for detecting an excess voltage at an anode terminal of said first thyristor; and a positive voltage control unit for shorting both ends of said first choke coil under control by an output signal of said positive voltage detection unit.

The present invention also provides a fuel injection control device for an internal combustion engine in which an electric charge stored in a piezoelectric element is discharged to a power source through a second thyristor controlling timing of an electric discharge, a second choke coil, and an ignition switch, comprising:

a negative voltage detection unit for detecting a voltage at a cathode terminal of said second thyristor; and a negative voltage control unit for controlling the voltage at the cathode terminal of the second thyristor to substantially a ground potential under control by an output signal of said negative voltage detection unit.

The present invention also provides a fuel injection control device for an internal combustion engine in which an electric charge stored in a piezoelectric element is discharged to a power source through a second thyristor controlling timing of an electric discharge, a second choke coil, and an ignition switch, comprising:

a negative voltage detection and holding unit for detecting a voltage at a cathode terminal of said second thyristor and for holding an electric charge; and a switching unit arranged between said second choke coil and said ignition switch for being controlled by said negative voltage detection and holding unit and for controlling the discharge.

SUMMARY OF THE PREFERRED EMBODIMENTS

With a fuel injection control device for an internal combustion engine of the present invention, if a desired voltage close to a withstand voltage is applied to a piezoelectric element, an output signal from a positive voltage detection unit actuates a positive voltage control unit to short both ends of a first choke coil. This causes the current flowing from the first choke coil to the first thyristor to flow in the positive voltage control unit. As a result thereof, the current through the first thyristor is cut off to turn the first thyristor to an OFF state to prevent a voltage in excess of the withstand voltage from being applied to the piezoelectric element.

When an electric charge stored in the piezoelectric element is being discharged, the voltage in the piezoelectric element leads the current in phase by 90° due to the second choke coil, so that, as the charge is discharged, a terminal voltage of the piezoelectric element is changed from a positive value to a negative value. When the desired negative voltage is exceeded, the negative voltage detection means is actuated to issue an output signal which renders a negative voltage control unit conductive to hold a cathode voltage of the second thyristor substantially at a ground voltage. As a result thereof, the second thyristor is reverse-biased and turned off to suppress the negative voltage across the piezoelectric element.

As alternative means for suppressing a negative voltage across the piezoelectric element, a desired negative voltage is detected by a negative voltage detection and holding unit, and switching unit is changed from its ON-state to its OFF-state by an output signal of the negative voltage detection and holding unit. An electric charge is stored in the capacitor arranged in the negative voltage detection and holding unit by the discharge current from the piezoelectric element to raise the voltage of the capacitance held on the negative voltage detection and holding unit.

By the repetition of the charging/discharging cycles of the piezoelectric element, the holding voltage held on the negative voltage detection and holding unit are raised. When the desired negative voltage is exceeded, the switching unit is turned on. As a result thereof, the discharge current from the piezoelectric element ceases to flow when the target negative voltage is reached, so that the negative voltage of the piezoelectric element may be maintained at a constant value.

According to the present invention, as described, since the positive and negative voltages applied to the piezoelectric element may be controlled within the constant range, there is no risk of application of a voltage in excess of a withstand voltage. Since the excess voltage is detected at the thyristor terminals, the piezoelectric element is not effected by leakage or the like. Consequently, there is no risk of the piezoelectric element being destroyed or lowered in properties, while the piezoelectric element may be improved in durability and operational reliability.

DETAILED DESCRIPTION OF THE PREFERRED EMBODIMENTS

Figure 1:
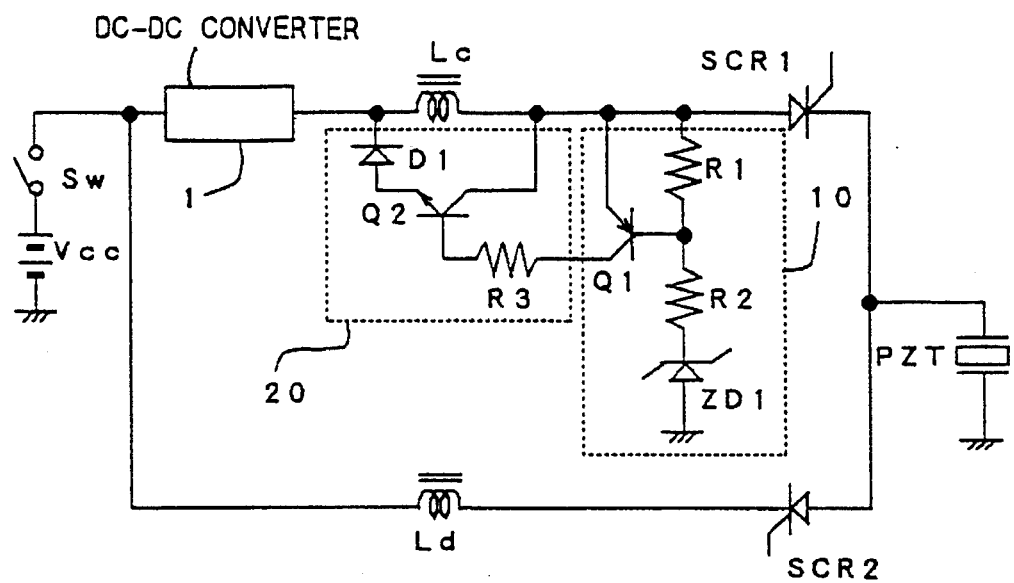
FIG. 1 illustrates an embodiment of the present invention having an excess positive voltage detection control circuit.

Referring to the drawings, preferred embodiments of the present invention will be explained in detail.

Embodiment 1

FIG. 1 shows an embodiment of the present invention as a circuit diagram having a protective circuit for preventing an excessive positive voltage from being applied across a piezoelectric element.

Referring to FIG. 1, a battery voltage $V_{cc}$ is applied to an input terminal of a dc-dc converter 1 via an ignition switch Sw. The dc-dc converter 1 has its output terminal connected to an anode of a first thyristor SCR1 via a first choke coil Lc. The first thyristor SCR1 has its cathode connected to a piezoelectric element PZT. Thus, when the thyristor SCR1 is rendered conductive with an external control signal, an electric charge is charged in the piezoelectric element PZT.

On the other hand, the piezoelectric element PZT is connected to an anode of a second thyristor SCR2 having its cathode connected via a second choke coil Ld to an input terminal of the dc-dc converter 1 and to the ignition switch Sw. When the second thyristor SCR2 is rendered conductive with an external control signal, the electric charge stored in the piezoelectric element PZT is discharged into the battery $V_{cc}$ through the second thyristor SCR2, the second choke coil Ld and the ignition switch Sw.

A positive voltage detection unit 10 is arranged between the choke coil Lc and the thyristor SCR1. An output signal of the positive voltage control unit 10 is fed to a positive voltage control unit 20, output terminals of which are connected to nodes across both ends of the choke coil Lc.

The positive voltage detection unit 10 is made up of resistors R1 and R2, a Zenor diode ZD1 and a transistor Q1. The resistor R1 has its one end connected to an anode of the thyristor SCR1, while having its other end connected to a junction node of the resistor R2 and the base of the transistor Q1. The resistor R2 has its other end connected to a cathode of the Zenor diode ZD1, which has its anode grounded as shown. The transistor Q1 has its emitter connected to an anode of the thyristor SCR1.

The positive voltage control unit 20 is made up of a resistor R3, a transistor Q2 and a diode D1. The resistor R3 has its one end connected to a collector of the transistor Q1, while having its other end connected to the base of the transistor Q2. The transistor Q2 has its emitter connected to an anode of the diode D1, while having its collector connected to a junction node of one end of the choke coil Lc and an anode of the thyristor SCR1. The diode D1 has its cathode connected to the other end of the choke coil Lc.

The operation of the circuit shown in FIG. 1, is as follows:

The voltage of the battery $V_{cc}$, supplied via the ignition switch Sw, is raised to e.g. 200 to 500 V by the dc-dc converter 1. Since a trigger signal for interrupting the fuel injection is connected to the gate terminal of the thyristor SCR1, the thyristor SCR1 is rendered conductive when the trigger signal is applied, so that the output voltage of the dc-dc converter 1 is fed to the piezoelectric element PZT via the choke coil Lc and the thyristor SCR1. When supplied with the voltage, the piezoelectric element PZT is deformed and increased in size or shape. The piezoelectric element PZT is employed as a valve for a fuel injection port of a fuel injection device and, when the voltage is applied, the piezoelectric element PZT is increased in size or shape to close the fuel injection port. That is, the piezoelectric element PZT is elongated in synchronism with the trigger signal applied to the thyristor SCR1 for closing the fuel injection port.

On the other hand, the choke coil Lc and the capacitance of the piezoelectric element PZT make up an LC resonance circuit. Thus, there may be occasions where a voltage in excess of an output voltage of the dc-dc converter 1 is applied to the piezoelectric element PZT to exceed its withstand voltage.

The Zenor diode ZD1 has a Zenor voltage e.g. of 900 V. If the anode terminal voltage of the thyristor SCR1, that is the applied voltage of the element PZT, exceeds 900 V, the base current of the transition Q1 begins to flow and the collector current of the transition Q1 flows via the resistor R3 into the base of the transistor Q2. Thus the transistor Q2 is rendered conductive so that the collector current flows. Thus the current flowing from the choke coil Lc through the thyristor SCR1 is now caused to flow as the collector current of the transistor Q2 and the current flowing through the thyristor SCR1 is reduced to a value lower than its holding current. As a result thereof, the thyristor SCR1 is rendered nonconductive to prevent an excess voltage from being applied to the piezoelectric element PZT to hold the voltage applied thereto just before the cutoff of the thyristor SCR1. Consequently, the fuel injection port is maintained in the state of valve closure.

According to the present invention, since the excess voltage is detected at the anode of the thyristor SCR1, excess voltage detection may be realized without the piezoelectric element PZT being affected with e.g. the current leakage. Although the Zenor diode ZD1 is used as the positive voltage detection unit 10, the voltage divider made up of the resistors R1 and R2 suffices for detecting the excess voltage.

Embodiment 2

Figure 2:
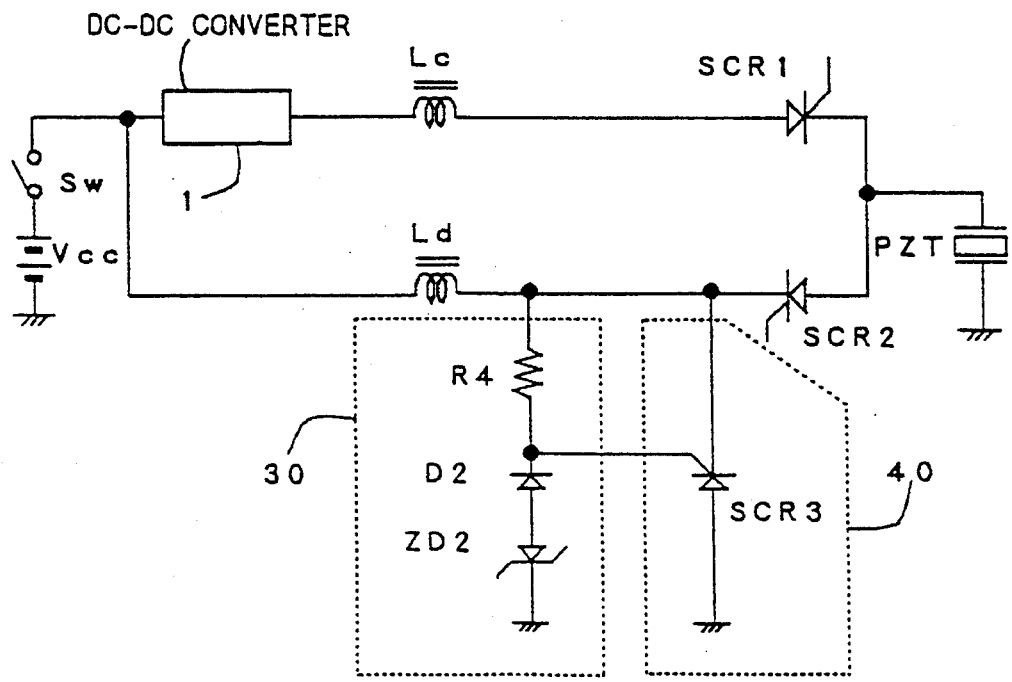
FIG. 2 illustrates an embodiment of the present invention having an excess negative voltage detection control circuit.

In FIG. 2, there is shown a circuit having a protective circuit portion for preventing an excess negative voltage during discharging of the piezoelectric element PZT.

In FIG. 2, the same circuit components as those used in FIG. 1 are denoted by the same reference numerals. Referring to FIG. 2, a negative voltage detection unit 30 for detecting a cathode potential of a thyristor SCR2 is connected to a cathode of the thyristor SCR2. An output of the negative voltage detection unit 30 is connected to a negative voltage control unit 40, which in turn is connected to the cathode of the thyristor SCR2 to reverse bias the thyristor SCR2.

The operation of the circuit shown in FIG. 2, is as follows:

The piezoelectric element PZT is extended as long as a electric charge is held on the element PZT, with a fuel injection port being thus closed. For opening the fuel injection port, the electric charge stored on the element PZT need to be discharged. The electric discharge is initiated when the trigger signal is applied to the gate terminal of the thyristor SCR2 to render the thyristor SCR2 conductive, with the electric charge being discharged to the battery $V_{cc}$ via thyristor SCR2, the choke coil Ld and the ignition switch Sw.

However, the capacitance of the piezoelectric element PZT in conjunction with the inductance of the choke coil Ld produce a resonance action, while the current is delayed in phase from the voltage by 90° due to the inductance of the choke coil Ld. Consequently, when the voltage across both ends of the choke coil Ld is gradually lowered from a positive value to zero, the current reaches a peak of a sinusoidal wave. When the current is lowered from its peak value, the voltage across both ends of the choke coil Ld is lowered from 0 V towards a negative voltage. Consequently a negative voltage is fed to piezoelectric element PZT during the electric discharge. If an excess negative voltage is applied, the property such as changes in the size or shape of the piezoelectric element is caused to be disturbed due to overshoot or undershoot characteristics (referred to as butterfly characteristics).

When a desired negative voltage is applied, the Zenor diode ZD2 in the negative voltage detection unit 30 is rendered conductive to cause the current to flow through the resistor R4 and through the gate terminal of the thyristor SCR3. This renders the thyristor SCR3 conductive, with its cathode terminal being substantially at a ground potential. Thus the cathode terminal of the thyristor SCR2 is also at the same potential, so that the thyristor SCR2 is reverse-biased and rendered nonconductive. As a result thereof, an excess negative voltage may be prevented from being applied across the piezoelectric element PZT.

In the above embodiment, the negative voltage is detected by the Zenor diode ZD2. However, the negative voltage detection may also be made by a voltage divider alone. In addition, the cathode terminal voltage of the thyristor SCR2 may also be controlled substantially to a ground potential by employing the combination of transistors or FETs in place of the thyristor SCR3.

Embodiment 3

Figure 3:
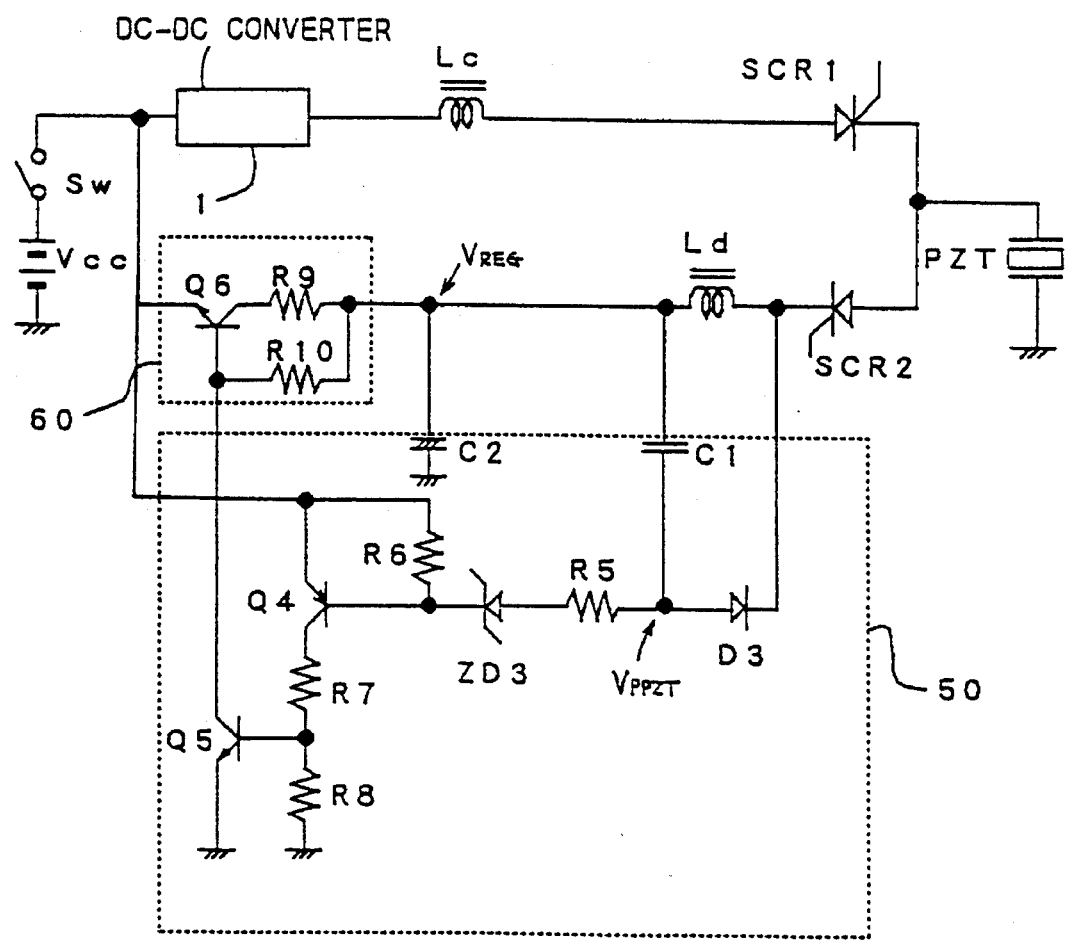
FIG. 3 illustrates a second embodiment of the present invention having an excess negative voltage detection control circuit.

FIG. 3 shows a modified embodiment of negative voltage control for the piezoelectric element PZT. In a current path of discharging the piezoelectric element PZT, shown therein, the element PZT has its one end grounded and its other end connected to an anode of a second thyristor SCR2, the cathode terminal of which is connected to one end of a second choke coil Ld. The other end of the second choke coil Ld is connected to a switching unit 60. A negative voltage detection and holding unit 50 has its voltage detection terminal connected to a junction node of the choke coil Ld and a cathode terminal of the thyristor SCR2, while having its voltage holding terminal connected to a junction node of the choke coil Ld and the switching unit 60. An output signal of the negative voltage detection and holding unit 50 is connected to the switching unit 60, while an output terminal of the switching unit 60 is connected to one end of the ignition switch Sw and to an input terminal of the dc-dc converter 1.

Referring to the negative voltage detection and holding unit 50 show in FIG. 3, a cathode terminal of a diode D3 is connected to a voltage detection terminal, while a anode terminal of the diode D3 is connected to a junction node of one end of a resistor R5 and one end of a capacitor C1 which is connected to the voltage holding terminal. The other end of the resistor R5 is connected to an anode terminal of a Zenor diode ZD3. A cathode terminal of the Zenor diode ZD3 is connected to a junction node of one end of a resistor R6 and the base of a transistor Q4, while the other end of the resistor R6 and the emitter of the transistor Q4 are connected to an emitter of a transistor Q6 of the switching unit 60. The transistor Q4 has its collector grounded via voltage divider resistors R7 and R8. A junction node of resistors R7 and R8 is connected to the base of a transistor Q5. The transistor Q5 has its emitter grounded, while having its collector connected to the base of the transistor Q6 of the switching unit 60. The transistor Q6 has its collector connected to its base via a load resistor R9 and a bias resistor R10, while a junction node of the resistors R9 and R10 is connected to one terminal of a capacitor C2 and to a voltage holding terminal of the choke coil Ld, with the other terminal of the capacitor C2 being grounded. The transistor Q6 has its emitter connected to an input of the dc-dc converter 1 and to one end of the ignition switch Sw.

Figure 4:
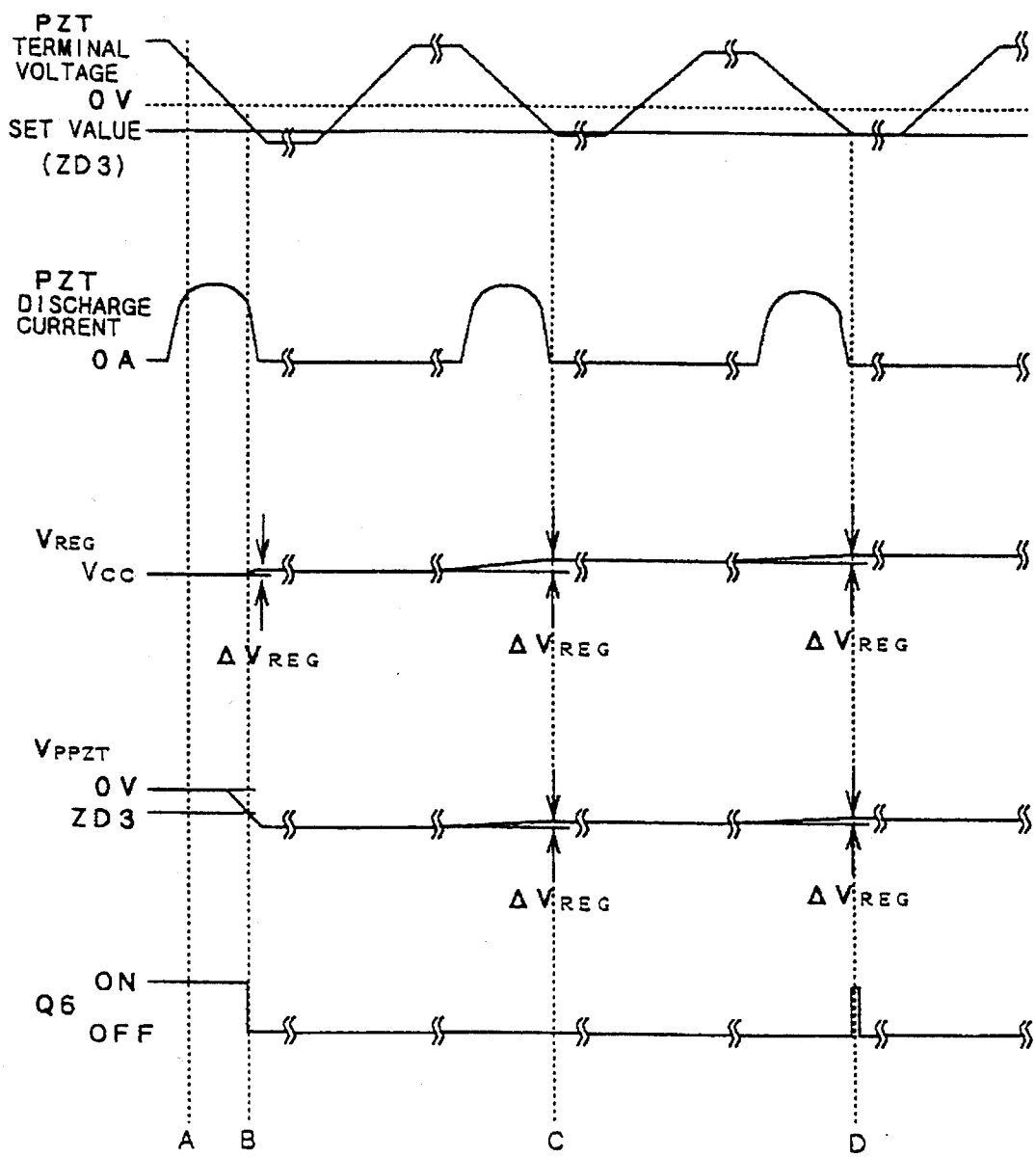
FIG. 4 is a voltage and current waveform diagram for the circuit shown in FIG. 3.

The operation of the circuit shown in FIG. 3 is explained on the basis of the voltage/current waveform diagram of FIG. 4. At the time of an electric discharge following a first electric charging of the piezoelectric element PZT, the discharge current flows through the thyristor SCR2, the choke coil Ld and the transistor Q6. A voltage at a node $V_{REG}$ at this time is substantially equal to the battery voltage $V_{cc}$. Since the diode D3 is turned off, a voltage at a node $V_{PPZT}$ is substantially zero. This state corresponds to a point A in FIG. 4.

During the electric discharge, the voltage and the current undergoes a phase shift of 90° relative to each other due to the choke coil Ld. When the discharge current of the piezoelectric element PZT reaches a peak value, the terminal voltage of the piezoelectric element PZT becomes equal to a voltage $V_{REG}$. When the discharge current of the piezoelectric element PZT is decreased from its peak value, the terminal voltage of the piezoelectric element PZT becomes negative, while the potential of the choke coil Ld at the side of the thyristor SCR2 is of the same negative value. However, the voltage $V_{REG}$ remains substantially equal to the $V_{cc}$ voltage. When the potential of the choke coil Ld at the side of the thyristor SCR2 becomes negative, the diode D3 is forward-biased due to the potential difference across the choke coil Ld. Thus, an electric charge is caused to flow from the node $V_{REG}$ to the capacitor C1 and to the diode D3. The voltage $V_{PPZT}$ is of a negative value substantially equal to that of the terminal voltage of the piezoelectric element PZT and is lowered with its terminal voltage.

When the terminal voltage of the piezoelectric element PZT is lowered further and becomes equal to a desired negative voltage as set by the Zenor diode ZD3, such as −300 V, the current flows through the diode D3, the Zenor diode DZ3 and the base of the transistor Q4 to turn on the transistor Q4. This causes the collector current of the transistor Q4 to flow into the voltage dividor resistors R7 and R8 to develop a base bias voltage of the transistor Q5 to turn on the transistor Q5. When the transistor Q5 is turned on, the base bias voltage of the transistor Q6 is almost at ground level and the transistor Q6 is turned off. Thus state corresponds to a point B in FIG. 4.

When the transistor Q6 is turned off, the discharge current of the piezoelectric element PZT flows through the thyristor SCR2, the choke coil Ld and the transistor Q5. The capacitor C2 is charged until the discharge current ceases to flow. Thus the voltage at the node $V_{REG}$ becomes equal to $V_{cc}+\Delta V_{REG}$ where $\Delta V_{REG}$ is a voltage increase, a value of which is about several volts. The voltage $V_{PPZT}$ is decreased further with the terminal voltage of the piezoelectric element PZT. When the discharge current is reduced to zero, the voltage $V_{PPZT}$ is maintained by the capacitor C1 at a negative value of e.g. −400 V. The terminal voltage of the capacitor C1 is equal to $V_{cc}+\Delta V_{REG}$, e.g. 25 V, at the $V_{REG}$ side and to e.g. −400 V at the $V_{PPZT}$ side.

When the piezoelectric element PZT is discharged after being charged a second time, since the transistor Q6 is now in a OFF state, the discharge current from the piezoelectric element PZT flows to the capacitor C2 via the thyristor SCR2 and the choke coil Ld, with the voltage $V_{REG}$ being increased gradually. Since the bias resistor R10 has a high resistance value, the current flowing through the transistor Q5 is substantially negligible.

As the voltage $V_{REG}$ becomes higher, the voltage $V_{PPZT}$ also becomes higher via the capacitor C1 by an amount the voltage $V_{REG}$ is raised. This corresponds to the state shown at C in FIG. 4.

The voltage of the node $V_{REG}$ becomes higher each time the piezoelectric element PZT is discharged. If the charging/discharging cycles of the piezoelectric element PZT are repeated tens of times and the voltage $V_{REG}$ is thereby increased by e.g. 100 V, the voltage $V_{PPZT}$ is raised e.g. from −400 V to −300 V. If the voltage $V_{PPZT}$ becomes higher than the voltage as set by the Zenor diode DZ3, such as −300 V, transistors Q4 and Q5 are both turned off, while the transistor Q6 is turned on. With the transistor Q6 being turned on, the capacitor C2 is discharged to lower the potential of the node $V_{REG}$. The potential of the node $V_{PPZT}$ is also lowered via the capacitor C1 to make the current to flow through the Zenor diode ZD3. This turns on transistors Q4 and Q5 while turning off the transistor Q6. The terminal voltage of the piezoelectric element PZT at this time is substantially equal to the voltage of the node $V_{PPZT}$. This corresponds to the state shown at D in FIG. 4.

Subsequently, the potentials of nodes $V_{REG}$, $V_{PPZT}$ are raised and lowered by the charging and discharging of the capacitor C2, with the transistor Q6 being repeatedly turned on and off in the vicinity of the voltage as set by the Zenor diode DZ3 for maintaining the potential $V_{PPZT}$ at substantially the same value. Consequently, the negative voltage of the piezoelectric element PZT at the time of the termination of discharging is maintained at a constant value.

It should be noted that further objects will become apparent in the entire disclosure and that modifications apparent in the art can be done without departing form the gist and scope of the present invention as disclosed herein and claimed as appended.

What is claimed is:

1. A fuel injection control device for an internal combustion engine in which an output voltage of a dc-dc converter for raising a power source voltage supplied thereto via an ignition switch is applied to a piezoelectric element through a first choke coil and a first thyristor controlling timing of charging the piezoelectric element, comprising:

a positive voltage detection unit for detecting an excess voltage at an anode terminal of said first thyristor; and a positive voltage control unit for shorting both ends of said first choke coil under control by an output signal of said positive voltage detection unit.

2. A fuel injection control device for an internal combustion engine in which an electric charge stored in a piezoelectric element is discharged to a power source through a thyristor controlling timing of an electric discharge, a choke coil, and an ignition switch, comprising:

a negative voltage detection unit for detecting a voltage at a cathode terminal of said thyristor; and a negative voltage control unit for controlling the voltage at the cathode terminal of the thyristor to substantially a ground potential under control by an output signal of said negative voltage detection unit.

3. A fuel injection control device for an internal combustion engine in which an electric charge stored in a piezoelectric element is discharged to a power source through a thyristor controlling timing of an electric discharge, a choke coil, and an ignition switch, comprising:

a negative voltage detection and holding unit for detecting a voltage at a cathode terminal of said thyristor and for holding an electric charge; and a switching unit arranged between said choke coil and said ignition switch for being controlled by said negative voltage detection and holding unit and for controlling the discharge.

\* \* \* \* \*